US010957299B2

(12) United States Patent
Tourbabin et al.

(10) Patent No.: US 10,957,299 B2
(45) Date of Patent: Mar. 23, 2021

(54) ACOUSTIC TRANSFER FUNCTION PERSONALIZATION USING SOUND SCENE ANALYSIS AND BEAMFORMING

(71) Applicant: Facebook Technologies, LLC, Menlo Park, CA (US)

(72) Inventors: Vladimir Tourbabin, Sammamish, WA (US); Jacob Ryan Donley, Kirkland, WA (US); Antonio John Miller, Woodinville, WA (US); Ravish Mehra, Tacoma, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/379,450

(22) Filed: Apr. 9, 2019

(65) Prior Publication Data

US 2020/0327877 A1   Oct. 15, 2020

(51) Int. Cl.
*G10K 11/178* (2006.01)
*H04R 1/40* (2006.01)
*H04R 3/00* (2006.01)

(52) U.S. Cl.
CPC ......... *G10K 11/1781* (2018.01); *H04R 1/406* (2013.01); *H04R 3/002* (2013.01); *G10K 2210/30232* (2013.01)

(58) Field of Classification Search
CPC ................... H04R 3/002; H04R 1/406; G10K 2210/30232; G10K 11/1781
USPC ...................................................... 381/71.6
See application file for complete search history.

(56) References Cited

U.S. PATENT DOCUMENTS

| 9,263,023 | B2 | 2/2016 | Anazawa |
| 9,948,256 | B1 | 4/2018 | Dow et al. |
| 2004/0209654 | A1 | 10/2004 | Cheung et al. |
| 2006/0109983 | A1 | 5/2006 | Young et al. |
| 2007/0135176 | A1 | 6/2007 | Ho et al. |
| 2013/0201397 | A1 | 8/2013 | Ayoub et al. |
| 2015/0057999 | A1 | 2/2015 | Leorin et al. |

(Continued)

FOREIGN PATENT DOCUMENTS

| EP | 3413589 A1 | 12/2018 |
| WO | WO 2015/103578 A1 | 7/2015 |

OTHER PUBLICATIONS

PCT International Search Report and Written Opinion, PCT Application No. PCT/US2020/025942, dated Jun. 23, 2020, 12 pages.

(Continued)

*Primary Examiner* — Paul Kim
(74) *Attorney, Agent, or Firm* — Fenwick & West LLP

(57) ABSTRACT

An audio system for a wearable device dynamically updates acoustic transfer functions. The audio system is configured to estimate a direction of arrival (DoA) of each sound source detected by a microphone array relative to a position of the wearable device within a local area. The audio system may track the movement of each sound source. The audio system may form a beam in the direction of each sound source. The audio system may identify and classify each sound source based on the sound source properties. Based on the DoA estimates, the movement tracking, and the beamforming, the audio system generates or updates the acoustic transfer functions for the sound sources.

20 Claims, 6 Drawing Sheets

(56) References Cited

U.S. PATENT DOCUMENTS

| | | | |
|---|---|---|---|
| 2015/0195641 A1* | 7/2015 | Di Censo | H04R 1/1083 |
| | | | 381/71.6 |
| 2016/0071526 A1 | 3/2016 | Wingate et al. | |
| 2016/0261532 A1 | 9/2016 | Garbin et al. | |
| 2018/0359572 A1* | 12/2018 | Jensen | H04R 25/453 |
| 2019/0069083 A1 | 2/2019 | Salehin et al. | |
| 2019/0394564 A1 | 12/2019 | Mehra et al. | |

OTHER PUBLICATIONS

United States Office Action, U.S. Appl. No. 16/221,864, dated Dec. 4, 2019, 8 pages.

* cited by examiner

US 10,957,299 B2

ACOUSTIC TRANSFER FUNCTION PERSONALIZATION USING SOUND SCENE ANALYSIS AND BEAMFORMING

BACKGROUND

The present disclosure generally relates to sound scene analysis, and specifically relates to using system feedback to improve sound scene analysis.

A sound perceived at two ears can be different, depending on a direction and a location of a sound source with respect to each ear as well as on the surroundings of a room in which the sound is perceived. Humans can determine a location of the sound source by comparing the sound perceived at each ear. In a "surround sound" system, a plurality of speakers reproduce the directional aspects of sound using acoustic transfer functions. An acoustic transfer function represents the relationship between a sound at its source location and how the sound is detected, for example, by a microphone array or by a person. A single microphone array (or a person wearing a microphone array) may have several associated acoustic transfer functions for several different source locations in a local area surrounding the microphone array (or surrounding the person wearing the microphone array). In addition, acoustic transfer functions for the microphone array may differ based on the position and/or orientation of the microphone array in the local area. Furthermore, the acoustic sensors of a microphone array can be arranged in many possible combinations, and, as such, the associated acoustic transfer functions are unique to the microphone array. As a result, determining acoustic transfer functions for each microphone array can require direct evaluation, which can be a lengthy and expensive process in terms of time and resources needed.

SUMMARY

An audio system for a wearable device dynamically updates acoustic transfer functions. The audio system is configured to estimate a direction of arrival (DoA) of each sound source detected by a microphone array relative to a position of the wearable device within a local area. The audio system may track the movement of each sound source. The audio system may isolate the signal from each sound source. The audio system may identify and classify each sound source based on the sound source properties. Based on the DoA estimates, the movement tracking, and the signal isolation, the audio system generates or updates the acoustic transfer functions for the sound sources.

Systems, methods, and articles of manufacture for dynamically updating acoustic transfer functions are disclosed. In some embodiments, the recited components may perform actions including: detecting, via a microphone array of a wearable device, sounds from one or more sound sources in a local area of the wearable device; estimating acoustic transfer functions associated with the sounds; estimating a direction of arrival (DoA) of a sound source in the one or more sound sources; tracking a movement of the sound source; and updating the acoustic transfer functions based on the movement of the sound source.

In various embodiments, the sound source may be classified based on a classification library. The signal from the sound source may be isolated from other sound sources in the local area of the wearable device. A first confidence level for the tracking, a second confidence level for the classifying, and a third confidence level for a beamforming process may be calculated. The acoustic transfer functions may be updated based on at least one of the first confidence level, the second confidence level, or the third confidence level. The tracking may comprise storing values for the number and locations of the one or more sound source over time, and detecting a change in at least one of the number or the locations. The system may update sound filters based on the updated acoustic transfer functions. The system may present audio content based on the updated sound filters.

Figure 1:
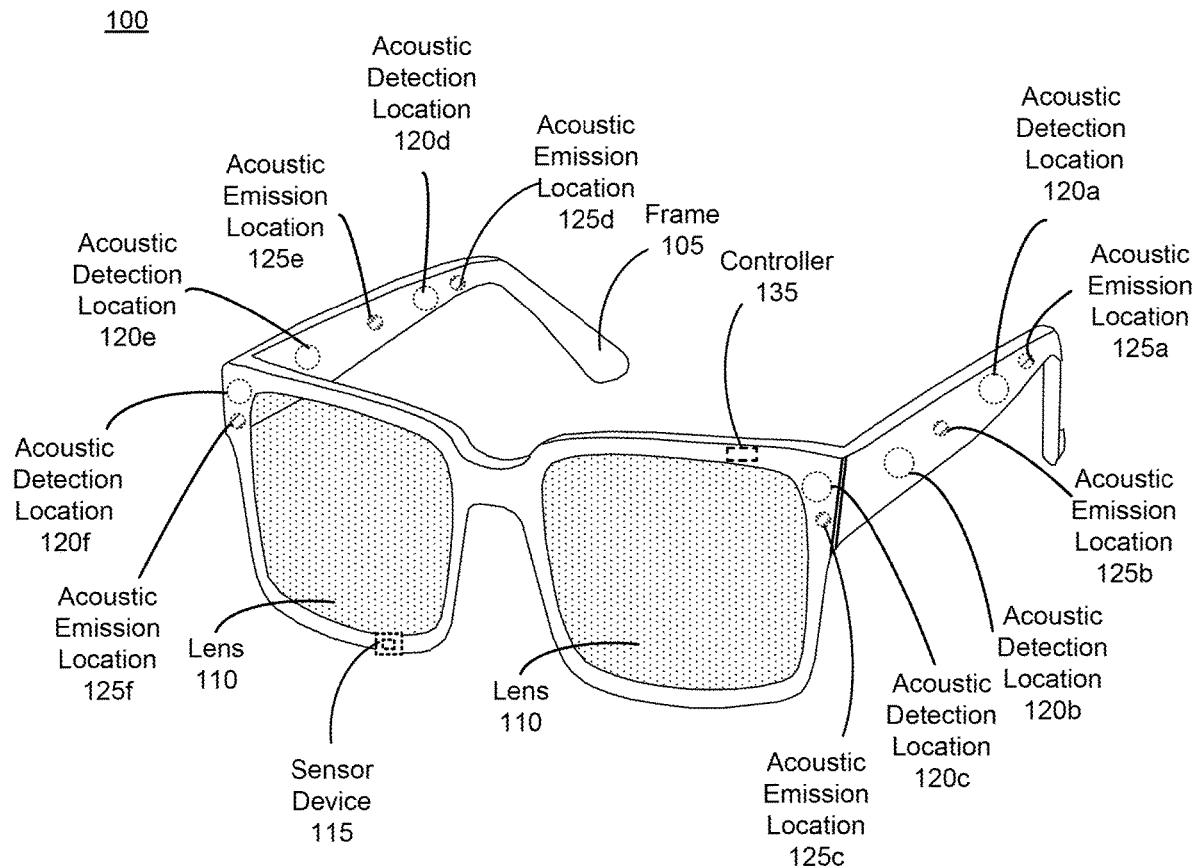
FIG. 1 is a diagram of a wearable device, in accordance with one or more embodiments.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

A wearable device may determine personalized acoustic transfer functions. The determined acoustic transfer functions may then be used for many purposes, such as to analyze a sound scene or to generate a surround sound experience for the person. To improve accuracy, multiple acoustic transfer functions may be determined for each speaker location (i.e., each speaker is generating a plurality of discrete sounds) in the wearable device.

An audio system in the wearable device detects sound sources to generate one or more acoustic transfer functions for a user. In one embodiment, the audio system includes a microphone array that includes a plurality of acoustic sensors and a controller. Each acoustic sensor is configured to detect sounds within a local area surrounding the microphone array. At least some of the plurality of acoustic sensors are coupled to a wearable device, such as a near-eye display (NED) configured to be worn by the user.

The controller is configured to estimate a direction of arrival (DoA) of each sound source detected by the microphone array relative to a position of the wearable device within the local area. The controller may track the movement of each sound source. The controller may form a beam for each sound source. The controller may identify and classify each sound source based on the sound source properties. Based on the DoA estimates, the movement tracking, and the beamforming, the controller generates or updates acoustic transfer functions for the sound sources.

An acoustic transfer function characterizes how a sound is received from a point in space. Specifically, an acoustic transfer function defines the relationship between parameters of a sound at its source location and the parameters at which the sound is detected by, for example, a microphone array or an ear of a user. The acoustic transfer function may be, e.g., an array transfer function (ATF) and/or a head-related transfer function (HRTF). Each acoustic transfer function is associated with a particular source location and a specific position of the wearable device within the local area, such that the controller may update or generate a new acoustic transfer function as the position of the sound source changes within the local area. In some embodiments, the audio system uses the one or more acoustic transfer functions to generate audio content (e.g., surround sound) for a user wearing the wearable device.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a wearable device connected to a host computer system, a standalone wearable device, a mobile device or computing system, or any other hardware platform capable of providing artificial reality content to one or more viewers.

FIG. 1 is an example illustrating a wearable device 100 including an audio system, according to one or more embodiments. As illustrated, the wearable device 100 may be an eyewear device designed to be worn on a head of a user. In other embodiments, the wearable device 100 may be a headset, necklace, bracelet, a clip-on device, or any other suitable device which may be worn or carried by a user. The wearable device 100 presents media to a user. In one embodiment, the wearable device 100 may comprise a near-eye display (NED). In another embodiment, the wearable device 100 may comprise a head-mounted display (HMD). In some embodiments, the wearable device 100 may be worn on the face of a user such that content (e.g., media content) is presented using one or both lenses 110 of the wearable device 100. However, the wearable device 100 may also be used such that media content is presented to a user in a different manner. Examples of media content presented by the wearable device 100 include one or more images, video, audio, or some combination thereof. The wearable device 100 includes the audio system, and may include, among other components, a frame 105, a lens 110, and a sensor device 115. While FIG. 1 illustrates the components of the wearable device 100 in example locations on the wearable device 100, the components may be located elsewhere on the wearable device 100, on a peripheral device paired with the wearable device 100, or some combination thereof.

The wearable device 100 may correct or enhance the vision of a user, protect the eye of a user, or provide images to a user. The wearable device 100 may be eyeglasses which correct for defects in a user's eyesight. The wearable device 100 may be sunglasses which protect a user's eye from the sun. The wearable device 100 may be safety glasses which protect a user's eye from impact. The wearable device 100 may be a night vision device or infrared goggles to enhance a user's vision at night. The wearable device 100 may be a near-eye display that produces artificial reality content for the user. Alternatively, the wearable device 100 may not include a lens 110 and may be a frame 105 with an audio system that provides audio content (e.g., music, radio, podcasts) to a user.

The lens 110 provides or transmits light to a user wearing the wearable device 100. The lens 110 may be prescription lens (e.g., single vision, bifocal and trifocal, or progressive) to help correct for defects in a user's eyesight. The prescription lens transmits ambient light to the user wearing the wearable device 100. The transmitted ambient light may be altered by the prescription lens to correct for defects in the user's eyesight. The lens 110 may be a polarized lens or a tinted lens to protect the user's eyes from the sun. The lens 110 may be one or more waveguides as part of a waveguide display in which image light is coupled through an end or edge of the waveguide to the eye of the user. The lens 110 may include an electronic display for providing image light and may also include an optics block for magnifying image light from the electronic display. Additional detail regarding the lens 110 is discussed with regards to FIG. 5.

In some embodiments, the wearable device 100 may include a depth camera assembly (DCA) (not shown) that captures data describing depth information for a local area surrounding the wearable device 100. In some embodiments, the DCA may include a light projector (e.g., structured light and/or flash illumination for time-of-flight), an imaging device, and a controller. The captured data may be images captured by the imaging device of light projected onto the local area by the light projector. In one embodiment, the DCA may include two or more cameras that are oriented to capture portions of the local area in stereo and a controller. The captured data may be images captured by the two or more cameras of the local area in stereo. The controller computes the depth information of the local area using the captured data and depth determination techniques (e.g., structured light, time-of-flight, stereo imaging, etc.). Based on the depth information, the controller determines absolute positional information of the wearable device 100 within the local area. The DCA may be integrated with the wearable device 100 or may be positioned within the local area external to the wearable device 100. In the latter embodiment, the controller of the DCA may transmit the depth information to the controller 135 of the wearable device 100.

The sensor device 115 generates one or more measurements signals in response to motion of the wearable device 100. The sensor device 115 may be located on a portion of the frame 105 of the wearable device 100. The sensor device 115 may include a position sensor, an inertial measurement unit (IMU), or both. Some embodiments of the wearable device 100 may or may not include the sensor device 115 or may include more than one sensor device 115. In embodiments in which the sensor device 115 includes an IMU, the IMU generates IMU data based on measurement signals from the sensor device 115. Examples of sensor devices 115 include: one or more accelerometers, one or more gyroscopes, one or more magnetometers, another suitable type of sensor that detects motion, a type of sensor used for error correction of the IMU, or some combination thereof. The sensor device 115 may be located external to the IMU, internal to the IMU, or some combination thereof.

Based on the one or more measurement signals, the sensor device 115 estimates a current position of the wearable device 100 relative to an initial position of the wearable device 100. The estimated position may include a location of the wearable device 100 and/or an orientation of the wearable device 100 or the user's head wearing the wearable device 100, or some combination thereof. The orientation may correspond to a position of each ear relative to the reference point. In some embodiments, the sensor device 115 uses the depth information and/or the absolute positional information from a DCA to estimate the current position of the wearable device 100. The sensor device 115 may include multiple accelerometers to measure translational motion (forward/back, up/down, left/right) and multiple gyroscopes to measure rotational motion (e.g., pitch, yaw, roll). In some embodiments, an IMU rapidly samples the measurement signals and calculates the estimated position of the wearable device 100 from the sampled data. For example, the IMU integrates the measurement signals received from the accelerometers over time to estimate a velocity vector and integrates the velocity vector over time to determine an estimated position of a reference point on the wearable device 100. The reference point is a point that may be used to describe the position of the wearable device 100. While the reference point may generally be defined as a point in space, however, in practice the reference point is defined as a point within the wearable device 100.

The audio system tracks motion of sound sources and dynamically updates acoustic transfer functions. The audio system comprises a microphone array, a controller, and a speaker array. However, in other embodiments, the audio system may include different and/or additional components. Similarly, in some cases, functionality described with reference to the components of the audio system can be distributed among the components in a different manner than is described here. For example, some or all of the functions of the controller may be performed by a remote server.

The microphone arrays record sounds within a local area of the wearable device 100. A local area is an environment surrounding the wearable device 100. For example, the local area may be a room that a user wearing the wearable device 100 is inside, or the user wearing the wearable device 100 may be outside and the local area is an outside area in which the microphone array is able to detect sounds. The microphone array comprises a plurality of acoustic detection locations that are positioned on the wearable device 100. An acoustic detection location includes either an acoustic sensor or a port. A port is an aperture in the frame 105 of the wearable device 100. In the case of an acoustic detection location, the port provides a coupling point for sound from a local area to an acoustic waveguide that guides the sounds to an acoustic sensor. An acoustic sensor captures sounds emitted from one or more sound sources in the local area (e.g., a room). Each acoustic sensor is configured to detect sound and convert the detected sound into an electronic format (analog or digital). The acoustic sensors may be acoustic wave sensors, microphones, sound transducers, or similar sensors that are suitable for detecting sounds.

In the illustrated configuration, the microphone array comprises a plurality of acoustic detection locations on the wearable device 100, for example acoustic detection locations 120a, 120b, 120c, 120d, 120e, and 120f The acoustic detection locations may be placed on an exterior surface of the wearable device 100, placed on an interior surface of the wearable device 100, separate from the wearable device 100 (e.g., part of some other device), or some combination thereof. In some embodiments, one or more of the acoustic detection locations 120a-f may also be placed in an ear canal of each ear. The configuration of the acoustic detection locations of the microphone array may vary from the configuration described with reference to FIG. 1. The number and/or locations of acoustic detection locations may be different from what is shown in FIG. 1. For example, the number of acoustic detection locations may be increased to increase the amount of audio information collected and the sensitivity and/or accuracy of the information. The acoustic detection locations may be oriented such that the microphone array is able to detect sounds in a wide range of directions surrounding the user wearing the wearable device 100. Each detected sound may be associated with a frequency, an amplitude, a phase, a time, a duration, or some combination thereof.

The speaker array presents audio content based on the ATFs. The speaker array comprises a plurality of acoustic emission locations on the wearable device 100. An acoustic emission location is a location of a speaker or a port in the frame 105 of the wearable device 100. In the case of an acoustic emission location, the port provides an outcoupling point of sound from an acoustic waveguide that separates a speaker of the speaker array from the port. Sound emitted from the speaker travels through the acoustic waveguide and is then emitted by the port into the local area.

In the illustrated embodiment, the speaker array includes acoustic emission locations 125a, 125b, 125c, 125d, 125e, and 125f. In other embodiments, the speaker array may include a different number of acoustic emission locations (more or less) and they may be placed at different locations on the frame 105. For example, the speaker array may include speakers that cover the ears of the user (e.g., headphones or earbuds). In the illustrated embodiment, the acoustic emission locations 125a-125f are placed on an exterior surface (i.e., a surface that does not face the user) of the frame 105. In alternate embodiments some or all of the acoustic emission locations may be placed on an interior surface (a surface that faces the user) of the frame 105. Increasing the number of acoustic emission locations may improve an accuracy (e.g., where a sound source is located) and/or resolution (e.g., a minimum distance between discrete sound sources) of a sound scene analysis associated with the audio content.

In some embodiments, each acoustic detection location is substantially collocated with a corresponding acoustic emission location. Substantially collocated refers to each acoustic detection location being less than a quarter wavelength away from the corresponding acoustic emission location. The number and/or locations of acoustic detection locations and corresponding acoustic emission locations may be different from what is shown in FIG. 1. For example, the number of acoustic detection locations and corresponding acoustic emission locations may be increased to increase accuracy of a sound scene analysis.

The controller 135 processes information from the microphone array that describes sounds detected by the microphone array. For each detected sound, the controller 135 performs a DoA estimation. The DoA estimate is an estimated direction from which the detected sound arrived at an acoustic sensor of the microphone array. If a sound is detected by at least two acoustic sensors of the microphone array, the controller 135 can use the known positional relationship of the acoustic sensors and the DoA estimate from each acoustic sensor to estimate a source location of the detected sound, for example, via triangulation. The controller 135 may use acoustic transfer functions to perform the DoA estimation. The accuracy of the source location estimation may increase as the number of acoustic sensors that detected the sound increases and/or as the distance between the acoustic sensors that detected the sound increases.

In some embodiments, the controller 135 may receive position information of the wearable device 100 from a system external to the wearable device 100. The position information may include a location of the wearable device 100, an orientation of the wearable device 100 or the user's head wearing the wearable device 100, or some combination thereof. The position information may be defined relative to a reference point. The orientation may correspond to a position of each ear relative to the reference point. Examples of systems include an imaging assembly, a console (e.g., as described in FIG. 5), a simultaneous localization and mapping (SLAM) system, a depth camera assembly, a structured light system, or other suitable systems. In some embodiments, the wearable device 100 may include sensors that may be used for SLAM calculations, which may be carried out in whole or in part by the controller 135. The controller 135 may receive position information from the system continuously or at random or specified intervals.

Based on parameters of the detected sounds, the controller 135 generates one or more acoustic transfer functions associated with the audio system. The acoustic transfer functions may be array transfer functions (ATFs), head-related transfer functions (HRTFs), other types of acoustic transfer functions, or some combination thereof. An ATF characterizes how the microphone array receives a sound from a point in space. Specifically, the ATF defines the relationship between parameters of a sound at its source location and the parameters at which the microphone array detected the sound. Parameters associated with the sound may include frequency, amplitude, duration, a DoA estimate, etc. In some embodiments, at least some of the acoustic sensors of the microphone array are coupled to an NED that is worn by a user. The ATF for a particular source location relative to the microphone array may differ from user to user due to a person's anatomy (e.g., ear shape, shoulders, etc.) that affects the sound as it travels to the person's ears. Accordingly, the ATFs of the microphone array are personalized for each user wearing the NED.

The HRTF characterizes how an ear receives a sound from a point in space. The HRTF for a particular source location relative to a person is unique to each ear of the person (and is unique to the person) due to the person's anatomy (e.g., ear shape, shoulders, etc.) that affects the sound as it travels to the person's ears. For example, in FIG. 1, the controller 135 may generate two HRTFs for the user, one for each ear. An HRTF or a pair of HRTFs can be used to create audio content that includes sounds that seem to come from a specific point in space. Several HRTFs may be used to create surround sound audio content (e.g., for home entertainment systems, theater speaker systems, an immersive environment, etc.), where each HRTF or each pair of HRTFs corresponds to a different point in space such that audio content seems to come from several different points in space. In some embodiments, the controller 135 may update a pre-existing acoustic transfer function based on the DoA estimate of each detected sound. As the position of the wearable device 100 changes within the local area, the controller 135 may generate a new acoustic transfer function or update a pre-existing acoustic transfer function accordingly.

In some embodiments, the controller may perform DoA estimations, track movement of the sound sources, isolate the signals from different sound sources, and classify the sound sources. Operations of the controller are described in detail below regarding FIGS. 3 and 4.

In the illustrated configuration the audio system is embedded into a NED worn by a user. In alternate embodiments, the audio system may be embedded into a head-mounted display (HMD) worn by a user. Although the description above discusses the audio assemblies as embedded into headsets worn by a user, it would be obvious to a person skilled in the art that the audio assemblies could be embedded into different wearable devices which could be worn by users elsewhere or operated by users without being worn.

Figure 2A:
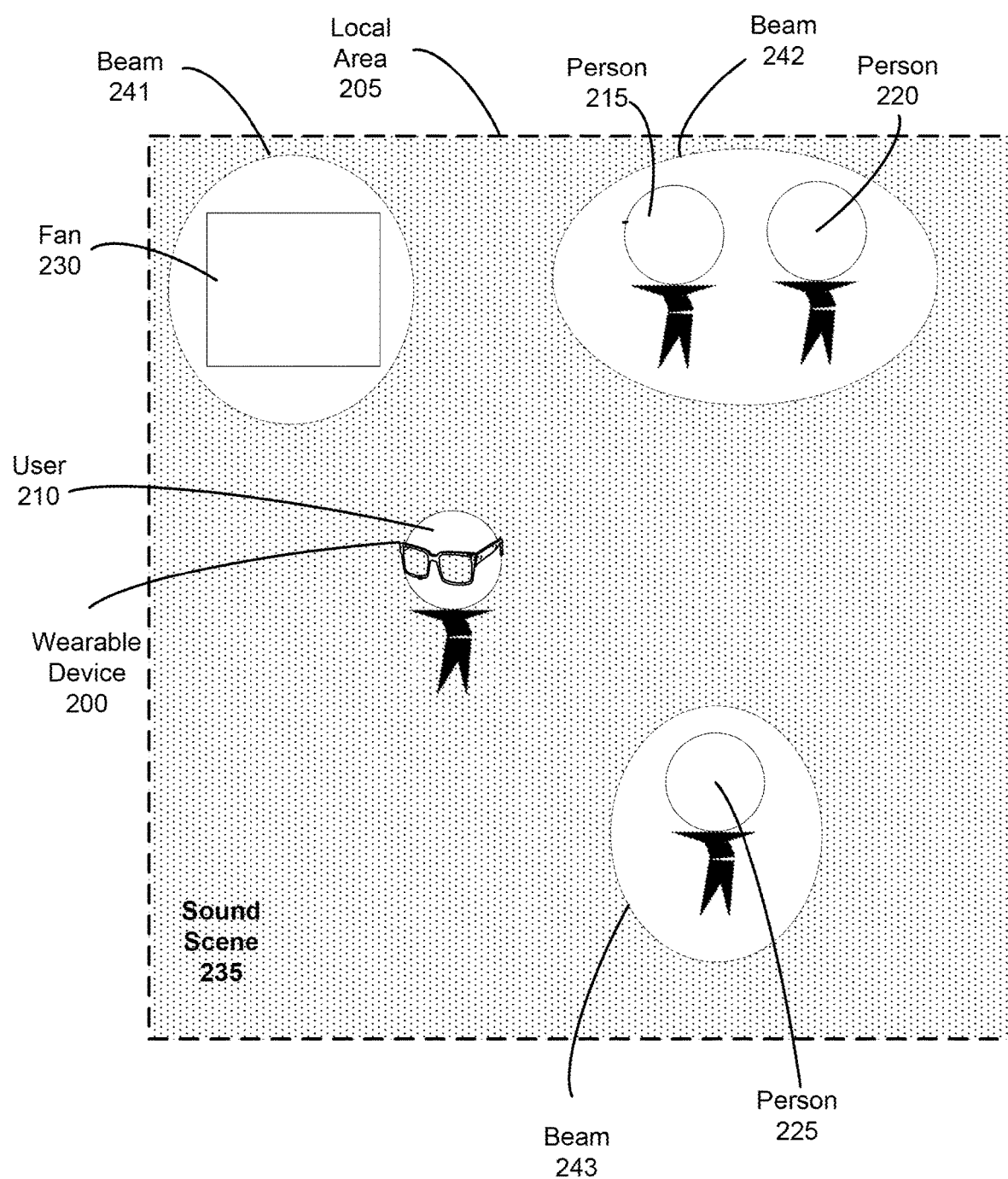
FIG. 2A illustrates a wearable device analyzing a sound scene within a local area, in accordance with one or more embodiments.

FIG. 2A illustrates a wearable device 200 analyzing a sound scene 235 within a local area 205, in accordance with one or more embodiments. The wearable device 200 is worn by a user 210 and includes an audio system (e.g., as described in FIGS. 1 and 3-5). The local area 205 includes a plurality of sound sources, specifically, a person 215, a person 220, a person 225, and a fan 230. The wearable device 200 performs a sound scene analysis. A sound scene describes, e.g., acoustic transfer functions associated with sound sources, a number of sound sources, locations of the sound sources, movement of the sound sources, classifications of the sound sources, or some combination thereof.

The wearable device 200 estimates a DoA for each sound source. Depending on the resolution of the wearable device 200 and the relative locations of the sound sources, multiple sound sources may be grouped together as a single sound source for analysis by the wearable device 200. For example, the person 215 and the person 220 are located adjacent to each other, and the wearable device 200 may, at least initially, identify the person 215 and the person 220 as a single sound source.

Figure 3:
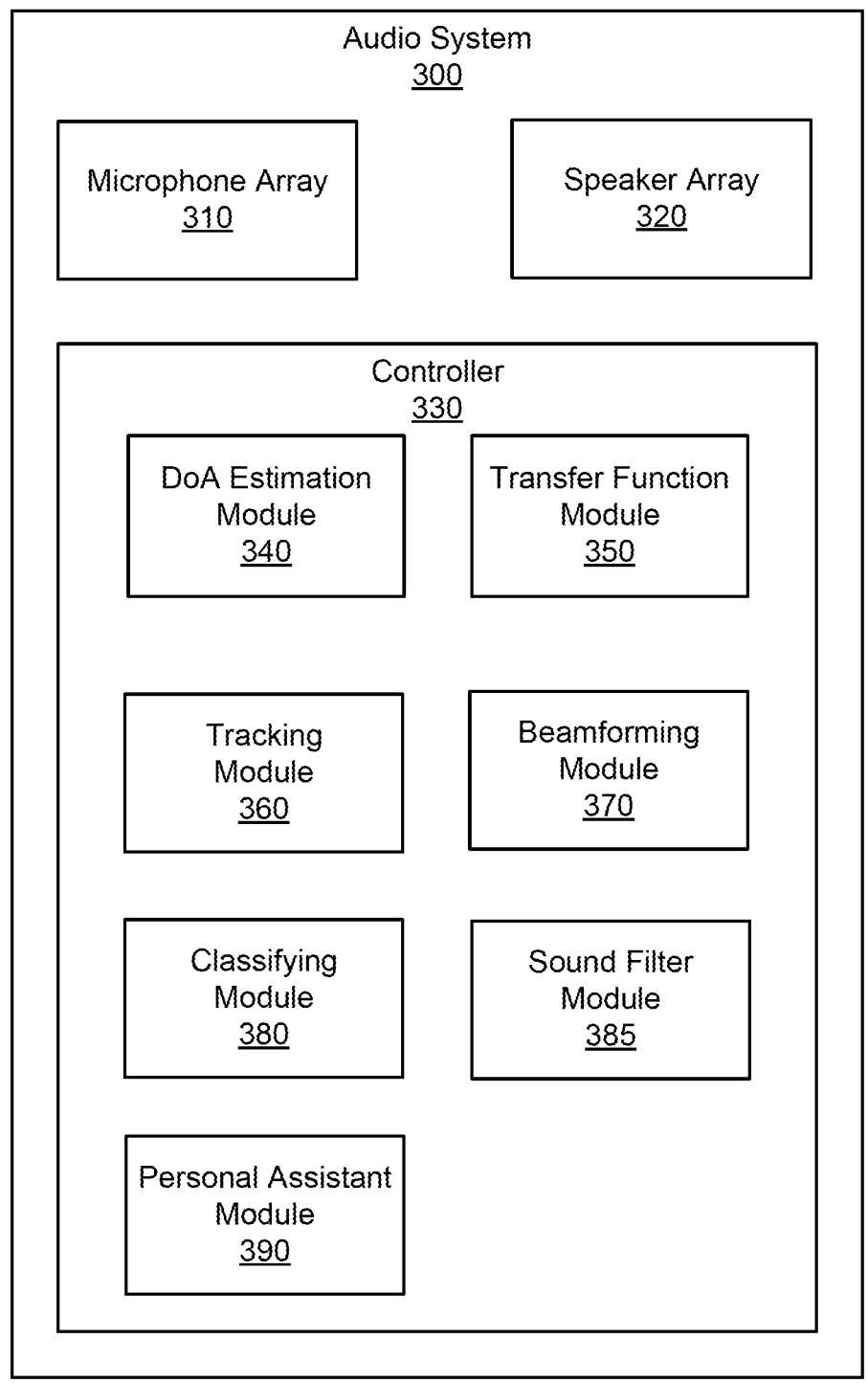
FIG. 3 is a block diagram of an example audio system, in accordance with one or more embodiments.

Based on the DoA estimates, the wearable device 200 forms one or more beams in the direction of each detected sound source, as further described with respect to FIG. 3. To form a beam (also referred to as beamforming) is a processing technique that the wearable device 200 uses to isolate and/or separate sounds produced by a sound source in the local area from other sound sources within the local area. For example, the wearable device 200 forms beam 241 around fan 230, beam 242 around person 215 and person 220, and beam 243 around person 225. By forming a beam for each sound source, the wearable device may separately process the data received by the microphone array for each sound source. The wearable device 200 may increase the relative difference of audio signals received from within a beam relative to other sounds in the local area 205. For example, the wearable device 200 may increase the amplitude of audio signals that are received from within a beam, may suppress audio signals that are received from outside of the beam, or some combination thereof.

The wearable device 200 is configured to classify each sound source. For example, based on the characteristics of the sound source, the wearable device 200 may classify a sound source as a human, an animal, an appliance, a vehicle, etc. The different classifications may affect how the wearable device 200 processes the sounds received by the microphone array and output by the speaker array. Based on the tracking, the beamforming, the sound classification, or some combination thereof, the audio system generates and/or updates sound filters, and provides the sound filters to the speaker array. The speaker array uses the sound filters to present audio content. In some embodiments, to increase the ability of the user to hear conversation, the wearable device 200 may apply sound filters to increase the audio signal from beams with a sound source classified as human, and the wearable device 200 may apply sound filters to suppress the audio signal from beams with a sound source classified as non-human.

Figure 2B:
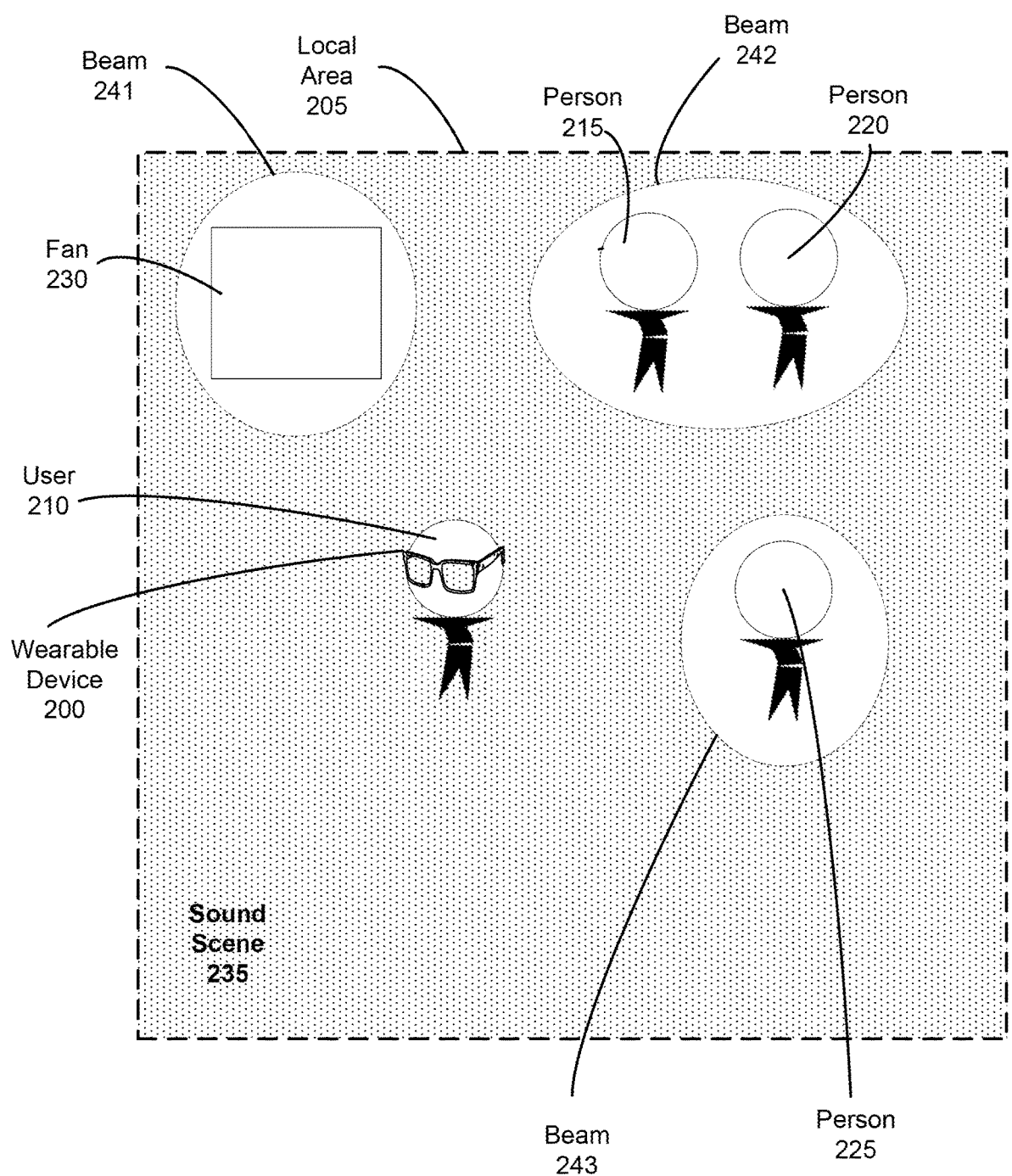
FIG. 2B illustrates a wearable device analyzing a sound scene within a local area after movement of a sound source, in accordance with one or more embodiments.

FIG. 2B illustrates the wearable device 200 analyzing the sound scene 235 after the person 225 has moved relative to the wearable device 200. The wearable device 200 is configured to monitor and analyze the sound scene 235 over time. As the person 225 moves, the wearable device 200 may track the movement of the person 225. In some embodiments, the wearable device 200 may detect the movement based on a changing DoA of the sound source, visual information received by the wearable device 200, or information received from an external data source. As relative positioning between the wearable device 200 and one or more of the persons 215, 220, 225 changes, the audio system dynamically adjusts the location of the beams to continue to include the persons 215, 220, 225. For example, as the person 225 walks towards the persons 215, 225, the wearable device 200 dynamically updates the sound scene analysis such that the beam 243 moves with the person 225. The wearable device 200 may utilize the results of the tracking, beamforming, and classifying of the sound sources as feedback to evaluate the accuracy of the acoustic transfer functions generated by the wearable device 200. The wearable device 200 may update the acoustic transfer functions based on the feedback. The updated acoustic transfer functions may be used to improve the accuracy of the DoA estimation, tracking, beamforming, and classifying. The updated acoustic transfer functions may be used to update the sound filters provided to the speaker array.

FIG. 3 is a block diagram of an audio system 300, in accordance with one or more embodiments. The audio system in FIGS. 1, 2A, and 2B may be embodiments of the audio system 300. The audio system 300 detects sound to generate one or more acoustic transfer functions for a user. The audio system 300 may then use the one or more acoustic transfer functions to generate audio content for the user. In the embodiment of FIG. 3, the audio system 300 includes a microphone array 310, a speaker array 320, and a controller 330. Some embodiments of the audio system 300 have different components than those described here. Similarly, in some cases, functions can be distributed among the components in a different manner than is described here.

The microphone array 310 detects sounds within a local area surrounding the microphone array 310. The microphone array 310 may include a plurality of acoustic sensors that each detect air pressure variations of a sound wave and convert the detected sounds into an electronic format (analog or digital). The plurality of acoustic sensors may be positioned on an eyewear device (e.g., wearable device 100), on a user (e.g., in an ear canal of the user), on a neckband, or some combination thereof. Each acoustic sensor of the microphone array 310 may be active (powered on) or inactive (powered off). The acoustic sensors are activated or deactivated in accordance with instructions from the controller 330. In some embodiments, all of the acoustic sensors in the microphone array 310 may be active to detect sounds, or a subset of the plurality of acoustic sensors may be active. An active subset includes at least two acoustic sensors of the plurality of acoustic sensors. An active subset may include, e.g., every other acoustic sensor, a pre-programmed initial subset, a random subset, or some combination thereof.

The speaker array 320 is configured to transmit sound to or from a user. The speaker array 320 may operate according to commands from the controller 330 and/or based on an audio characterization configuration from the controller 330. Based on the audio characterization configuration, the speaker array 320 may produce binaural sounds that seem to come from a particular point in space. The speaker array 320 may provide a sequence of sounds and/or surround sound to the user. In some embodiments, the speaker array 320 and the microphone array 310 may be used together to provide sounds to the user. In some embodiments, the speaker array 320 may project sounds to specific locations in a sound scene, or the speaker array 320 may prevent sounds from being projected to specific locations in a sound scene. The speaker array 320 may present sounds according to sound filters utilized by the controller 330.

The speaker array 320 may be coupled to a wearable device to which the microphone array 310 is coupled. In alternate embodiments, the speaker array 320 may be a plurality of speakers surrounding a user wearing the microphone array 310. In one embodiment, the speaker array 320 transmits test sounds during a calibration process of the microphone array 310. The controller 330 may instruct the speaker array 320 to produce test sounds and then may analyze the test sounds received by the microphone array 310 to generate acoustic transfer functions for the wearable device. Multiple test sounds with varying frequencies, amplitudes, durations, or sequences can be produced by the speaker array 320.

The controller 330 processes information from the microphone array 310. In addition, the controller 330 controls other modules and devices of the audio system 300. In the embodiment of FIG. 3, the controller 330 includes the DoA estimation module 340, the transfer function module 350, the tracking module 360, the beamforming module 370, the classifying module 380, the sound filter module 385, and the personal assistant module 390.

The DoA estimation module 340 is configured to perform a DoA estimation for detected sounds. If a sound is detected by at least two acoustic sensors of the microphone array, the controller 330 can use the positional relationship of the acoustic sensors and the DoA estimate from each acoustic sensor to estimate a source location of the detected sound, for example, via triangulation. The estimated source location may be a relative position of the source location in the local area relative to a position of the microphone array 310. The position of the microphone array 310 may be determined by one or more sensors on a wearable device having the microphone array 310. In some embodiments, the controller 330 may determine an absolute position of the source location if an absolute position of the microphone array 310 is known in the local area. The position of the microphone array 310 may be received from an external system (e.g., an imaging assembly, an AR or VR console, a SLAM system, a depth camera assembly, a structured light system etc.). The external system may create a virtual model of the local area, in which the local area and the position of the microphone array 310 are mapped. The received position information may include a location and/or an orientation of the microphone array in the mapped local area. The controller 330 may update the mapping of the local area with determined source locations of detected sounds. The controller 330 may receive position information from the external system continuously or at random or specified intervals.

The DoA estimation module 340 selects the detected sounds for which it performs a DoA estimation. The DoA estimation module 340 populates an audio data set with information. The information may include a detected sound and parameters associated with each detected sound. Example parameters may include a frequency, an amplitude, a duration, a DoA estimate, a source location, a time of the measurement, or some combination thereof. Each audio data set may correspond to a different source location relative to the microphone array 310 and include one or more sounds having that source location. The DoA estimation module 340 may populate the audio data set as sounds are detected by the microphone array 310. The DoA estimation module 340 may evaluate the stored parameters associated with each detected sound and determine if one or more stored parameters meet a corresponding parameter condition. For example, a parameter condition may be met if a parameter is above or below a threshold value or falls within a target range. If a parameter condition is met, the DoA estimation module 340 performs a DoA estimation for the detected sound. For example, the DoA estimation module 340 may perform a DoA estimation for detected sounds that have a frequency within a frequency range, an amplitude above a threshold amplitude, a duration below a threshold duration range, other similar variations or some combination thereof. Parameter conditions may be set by a user of the audio system 300, based on historical data, based on an analysis of the information in the audio data set (e.g., evaluating the collected information for a parameter and setting an average), or some combination thereof. The DoA estimation module 340 may further populate or update the audio data set as it performs DoA estimations for detected sounds. The DoA estimation module 340 may calculate a confidence level for each DoA estimate. The confidence level may be measured based on the sharpness of a peak in an underlying spatial spectrum. In some embodiments where a time difference of arrival-based algorithm is employed, the confidence level may be measured based on a sharpness of a cross-correlation function. The confidence level for a DoA estimate may represent a likelihood that the sound source is located in the location estimated by the DoA estimation module 340. For example, the confidence level may range from 1-100, where a theoretical confidence level of 100 represents that there is zero uncertainty in the DoA estimate, and a confidence level of 1 represents a high level of uncertainty in the DoA estimate.

The transfer function module 350 is configured to generate one or more acoustic transfer functions associated with the source locations of sounds detected by the microphone array 310. Generally, a transfer function is a mathematical function giving a corresponding output value for each possible input value. Each acoustic transfer function may be associated with a position (i.e., location and/or orientation) of the microphone array or person and may be unique to that position. For example, as the location of a sound source and/or a location or orientation of the microphone array or head of the person changes, sounds may be detected differently in terms of frequency, amplitude, etc. In the embodiment of FIG. 3, the transfer function module 350 uses the information in the audio data set to generate the one or more acoustic transfer functions. The information may include a detected sound and parameters associated with each detected sound. The DoA estimates from the DoA estimation module 340 and their respective confidence levels may be used as inputs to the transfer function module 350 to improve the accuracy of the acoustic transfer functions. Additionally, the transfer function module 350 may receive feedback from the tracking module 360, the beamforming module 370, and the classifying module 380 to update the acoustic transfer functions.

In some embodiments, the DoA estimation module 340 may preselect only the direct sound and remove the reflected sound. The direct sound can be used to extract the acoustic transfer function. For more information regarding extracting acoustic transfer functions, see U.S. application Ser. No. 16/015,879, entitled "AUDIO SYSTEM FOR DYNAMIC DETERMINATION OF PERSONALIZED ACOUSTIC TRANSFER FUNCTIONS" and filed on Jun. 22, 2018, the contents of which are incorporated by reference herein in their entirety. The feedback can be used to control the adaptation process.

The feedback from the DoA estimation module 340, the tracking module 360, the beamforming module 370, and the classifying module 380 may be used to update the acoustic transfer functions. Each module may be weighted differently. In some embodiments, the weight may be based on the order in the processing chain. For example, the feedback from the DoA estimation module 340 may receive a weight of 0.4, the feedback from the tracking module 360 may receive a weight of 0.3, the feedback from the beamforming module 370 may receive a weight of 0.2, and the feedback from the classifying module 380 may receive a weight of 0.1. However, this is just one example, and those skilled in the art will recognize that many different weighting schemes may be used, and in some embodiments, the weights may be inferred by trial and error or by performing a statistical analysis using experimental data.

The acoustic transfer functions may be used for various purposes discussed in greater detail below. In some embodiments, the transfer function module 350 may update one or more pre-existing acoustic transfer functions based on the DoA estimates of the detected sounds. As the position (i.e., location and/or orientation) of the sound sources or microphone array 310 changes within the local area, the controller 330 may generate a new acoustic transfer function or update a pre-existing acoustic transfer function accordingly associated with each position.

In some embodiments, the transfer function module 350 generates an array transfer function (ATF). The ATF characterizes how the microphone array 310 receives a sound from a point in space. Specifically, the ATF defines the relationship between parameters of a sound at its source location and the parameters at which the microphone array 310 detected the sound. The transfer function module 350 may generate one or more ATFs for a particular source location of a detected sound, a position of the microphone array 310 in the local area, or some combination thereof. Factors that may affect how the sound is received by the microphone array 310 may include the arrangement and/or orientation of the acoustic sensors in the microphone array 310, any objects in between the sound source and the microphone array 310, an anatomy of a user wearing the wearable device with the microphone array 310, or other objects in the local area. For example, if a user is wearing a wearable device that includes the microphone array 310, the anatomy of the person (e.g., ear shape, shoulders, etc.) may affect the sound waves as they travel to the microphone array 310. In another example, if the user is wearing a wearable device that includes the microphone array 310 and the local area surrounding the microphone array 310 is an outside environment including buildings, trees, bushes, a body of water, etc., those objects may dampen or amplify the amplitude of sounds in the local area. Generating and/or updating an ATF improves the accuracy of the audio information captured by the microphone array 310.

In one embodiment, the transfer function module 350 generates one or more HRTFs. An HRTF characterizes how an ear of a person receives a sound from a point in space. The HRTF for a particular source location relative to a person is unique to each ear of the person (and is unique to the person) due to the person's anatomy (e.g., ear shape, shoulders, etc.) that affects the sound as it travels to the person's ears. The transfer function module 350 may generate a plurality of HRTFs for a single person, where each HRTF may be associated with a different source location, a different position of the person wearing the microphone array 310, or some combination thereof. In addition, for each source location and/or position of the person, the transfer function module 350 may generate two HRTFs, one for each ear of the person. As an example, the transfer function module 350 may generate two HRTFs for a user at a particular location and orientation of the user's head in the local area relative to a single source location. If the user turns his or her head in a different direction, the transfer function module 350 may generate two new HRTFs for the user at the particular location and the new orientation, or the transfer function module 350 may update the two pre-existing HRTFs. Accordingly, the transfer function module 350 generates several HRTFs for different source locations, different positions of the microphone array 310 in a local area, or some combination thereof.

In some embodiments, the transfer function module 350 may use the plurality of HRTFs and/or ATFs for a user to provide audio content for the user. The transfer function module 350 may generate an audio characterization configuration that can be used by the speaker array 320 for generating sounds (e.g., stereo sounds or surround sounds). The audio characterization configuration is a function, which the audio system 300 may use to synthesize a binaural sound that seems to come from a particular point in space. Accordingly, an audio characterization configuration specific to the user allows the audio system 300 to provide sounds and/or surround sound to the user, or to project sounds to different locations in the sound scene. The audio system 300 may use the speaker array 320 to provide the sounds. In some embodiments, the audio system 300 may use the microphone array 310 in conjunction with or instead of the speaker array 320. In one embodiment, the plurality of ATFs, plurality of HRTFs, and/or the audio characterization configuration are stored on the controller 330. The tracking module 360 is configured to track locations of one or more sound sources. The tracking module 360 may compare current DoA estimates or sound parameters and compare them with a stored history of previous DoA estimates or sound parameters. In some embodiments, the audio system 300 may recalculate DoA estimates on a periodic schedule, such as once per second, or once per millisecond. The tracking module may compare the current DoA estimates with previous DoA estimates, and in response to a change in a DoA estimate for a sound source, the tracking module 360 may determine that the sound source moved. In some embodiments, the tracking module 360 may detect a change in location based on visual information received by the wearable device or information received from an external data source. The tracking module 360 may track the movement of one or more sound sources over time. The tracking module 360 may store values for the number of sound sources and the location of each sound source at each point in time. In response to a change in a value of the number or locations of the sound sources, the tracking module 360 may determine that a sound source moved. The tracking module 360 may calculate an estimate of the localization variance. The localization variance may be used as a confidence level for each determination of a change in movement.

The beamforming module 370 is configured to form beams in the direction of sounds received at the microphone array 310 from discrete sound sources. The beamforming module 370 may isolate the audio signal received from within a beam from other sound sources in the local area based on different DoA estimates from the DoA estimation module 340 and the tracking module 360. Beamforming, also referred to as spatial filtering, is a signal processing technique used in sensor arrays for directional reception. The beamforming module 370 may combine elements in the microphone array 310 or the speaker array 320 in such a way that signals received from particular angles experience constructive interference while others experience destructive interference. To change the directionality of the array, the beamforming module may control the phase and relative amplitude of the signal at each microphone or speaker, in order to create a pattern of constructive and destructive interference in the wavefront. When analyzing sounds detected by the microphone array 310, the beamforming module 370 may combine information from different microphones in a way where the expected pattern of radiation is preferentially observed. The beamforming module 370 may thus selectively analyze discrete sound sources in the local area. In some embodiments, the beamforming module 370 may enhance the signal from a sound source. For example, the beamforming module 370 may apply sound filters which eliminate signals above, below, or between certain frequencies. Signal enhancement acts to enhance sounds associated with a given identified sound source relative to other sounds detected by the microphone array 310.

The beamforming module 370 may calculate a confidence level for the accuracy of the location or other aspects of the beam. In some embodiments, the beamforming module 370 may use an array gain calculation as the confidence level. The array gain is a ratio between an output signal to noise ratio (SNR) to an input SNR. A relatively higher array gain represents a higher confidence level. The beamforming module 370 may provide the isolated signals from the sound sources and their respective confidence levels to the transfer function module 350 to be used as inputs to improve the accuracy of the acoustic transfer functions.

The classifying module 380 is configured to classify the detected sound sources. In some embodiments, the classifying module 380 classifies the identified sound sources as being either a human type or a non-human type. A human type sound source is a person and/or device controlled by a person (e.g., a phone, a conferencing device, a telecommuting robot). A non-human type sound source is any sound source that is not classified as a human type sound source. A non-human type sound source may include, e.g., a television, a radio, an air conditioning unit, a fan, any sound source that is not classified as a human type sound source, or some combination thereof. In some embodiments, the classifying module 380 classifies the sound source into narrower categories, such as male, female, dog, television, vehicle, etc. The classifying module 380 may store a classification library. The classification library may store a list of sound source classifications, as well as parameters which indicate that a sound source meets a particular classification. For example, sound source classifications may include: human, animal, mechanical, digital, instrument, vehicle, etc. In some embodiment, the sound source classifications may include sub-classifications. For example, the human classification may include the sub-classifications of male, female, adult, child, speaking, laughing, yelling, etc. The parameters may include categories such as frequency, amplitude, duration, etc. Each classification or sub-classification is associated with parameters representing the classification. The classifying module 380 may compare the parameters of a sound source with those in the classification library to classify the sound source.

Additionally, in some embodiments, the user may manually classify objects and/or people in the local area. For example, the user may identify a person as a human using an interface on the wearable device. Once a sound source is classified, the classifying module 380 associates the acoustic transfer functions associated with the sound source as being of the same type.

The classifying module 380 determines a type of the sound source by analyzing the acoustic transfer functions associated with the identified sound source and/or sounds detected by the microphone array 310. In some embodiments, the classifying module 380 may analyze the isolated signals as provided by the beamforming module 370 to classify the sound sources.

The classifying module 380 may calculate a confidence level for the classification of the sound sources. The classification module may output a number that represents a probability that the input audio sample belongs to a given class. The probability number may be used as the confidence level. The classifying module 380 may provide the classification of the sound sources and their respective confidence levels to the transfer function module 350 to be used as inputs to improve the accuracy of the acoustic transfer functions.

The audio system 300 is continually receiving sounds from the microphone array 310. Accordingly, the controller 330 can dynamically update (e.g., via the modules within the controller 330) the acoustic transfer functions and sound scene analysis as relative locations change between the wearable device and any sound sources within the local area. The updated acoustic transfer functions may be used by the DoA estimation module 340, the tracking module 360, the beamforming module 370, and the classifying module 380 to increase the accuracy of the respective calculations of each module.

The sound filter module 385 determines sound filters for the speaker array 320. In some embodiments, the sound filter module 385 and the beamforming module 370 may utilize binaural beamforming, which combines beamforming and playback into a single step using the acoustic transfer functions. In such cases, the sound filter module 385 and the beamforming module 370 determine the sound filters by applying an optimization algorithm to the acoustic transfer functions. However, in some embodiments, the beamforming module 370 applies the optimization algorithm to the acoustic transfer functions prior to the sound filter module 385 determining the sound filters. The optimization algorithm is subject to one or more constraints. A constraint is a requirement that can affect the results of the optimization algorithm. For example, a constraint may be, e.g., a classification of a sound source, that audio content output by the speaker array 320 is provided to ears of the user, energy and/or power of a sum of the acoustic transfer functions classified as human type is minimized or maximized, that audio content output by the speaker array 320 has distortion less than a threshold amount at the ears of the user, some other requirement that can affect the results of the optimization algorithm, or some combination thereof. The optimization algorithm may be, e.g., a linearly constrained minimum variance (LCMV) algorithm, a minimum variance distortionless response (MVDR), or some other adaptive beamforming algorithm that determines sound filters. In some embodiments, the optimization algorithm may also utilize a direction of arrival of sound from the identified sound sources and/or relative locations of the one or more sound sources to the headset to determine the sound filters. The optimization algorithm may output sound filters. The sound filter module 385 provides the sound filters to the speaker array 320. The sound filters, when applied to an audio signal, cause the speaker array 320 to present audio content that amplifies or dampens sound sources. In some embodiments, the sound filters may cause the speaker array 320 to amplify human sound sources, and to dampen non-human sound sources. In some embodiments, the sound filters may cause the speaker array 320 to generate a sound field with reduced amplitudes in one or more damped regions that are occupied by sound sources.

As noted above, the optimization algorithm can be constrained by a classification type of a sound source. For example, the sound filter module 385 and/or the beamforming module 370 may apply the optimization algorithm to the acoustic transfer functions in a manner such that an energy of a sum of energies of the acoustic transfer functions classified as human type is minimized. An optimization algorithm constrained in this manner may generate sound filters such that damped areas would be located where sound sources classified as human type are present, but would not be located where sound sources classified as non-human type are present. One advantage of classification is that it can potentially reduce a number of damped regions within the sound field, thereby reducing complexity of the sound field and hardware specifications for the speaker array 320 (e.g., a number of acoustic emission locations and acoustic detection locations). Reduction in the number of damped regions may also increase suppression of the damped regions used.

In response to the transfer function module 350 updating the acoustic transfer functions, the sound filter module 385 may apply the optimization algorithm to the updated acoustic transfer functions. The sound filter module 385 may provide the updated sound filters to the speaker array 320. Having classified some or all sound sources in the sound scene, the sound filters may be applied to emphasize or suppress selected sound sources. The selected sound sources may be decided based on a given scenario, a user's input, or various algorithms employed by the device as described herein.

The personal assistant module 390 is configured to provide useful information about the sound scene analysis to the user. The personal assistant module 390 may provide the information to the user via the speaker array 320 or a visual display on a wearable device. For example, the personal assistant module 390 may provide the number, location, and classification of the various sound sources to the user. The personal assistant module 390 may transcribe speech from a human sound source. The personal assistant module 390 may provide descriptive information about a sound source, such as information about a specific person if that person is listed in the classification library, or a make and model of a mechanical sound source.

Additionally, the personal assistant module 390 may provide a predictive analysis of the sound scene. For example, the personal assistant module 390 may determine that, based on the spatial information provided by the tracking module 360, a sound source identified by the classifying module 380 as a vehicle is rapidly moving in the direction of the user, and the personal assistant module 390 may generate a notification of the movement of the vehicle to warn the user via the speaker array 320 or a visual display that the user is in danger of being struck by the vehicle. In some embodiments, the personal assistant module 390 may predict or request input from the user regarding which sound sources should be amplified and which sound sources should be dampened. For example, the personal assistant module 390 may determine, based on previously stored interactions with the user or with other users, that the sound from the closest human sound source to the user should be amplified, and all other sound sources should be damped. This may assist the user in holding a conversation in a loud environment. Those skilled in the art will recognize that the above specific examples represent a small portion of the many available uses for the personal assistant module 390 and audio system 300.

Figure 4:
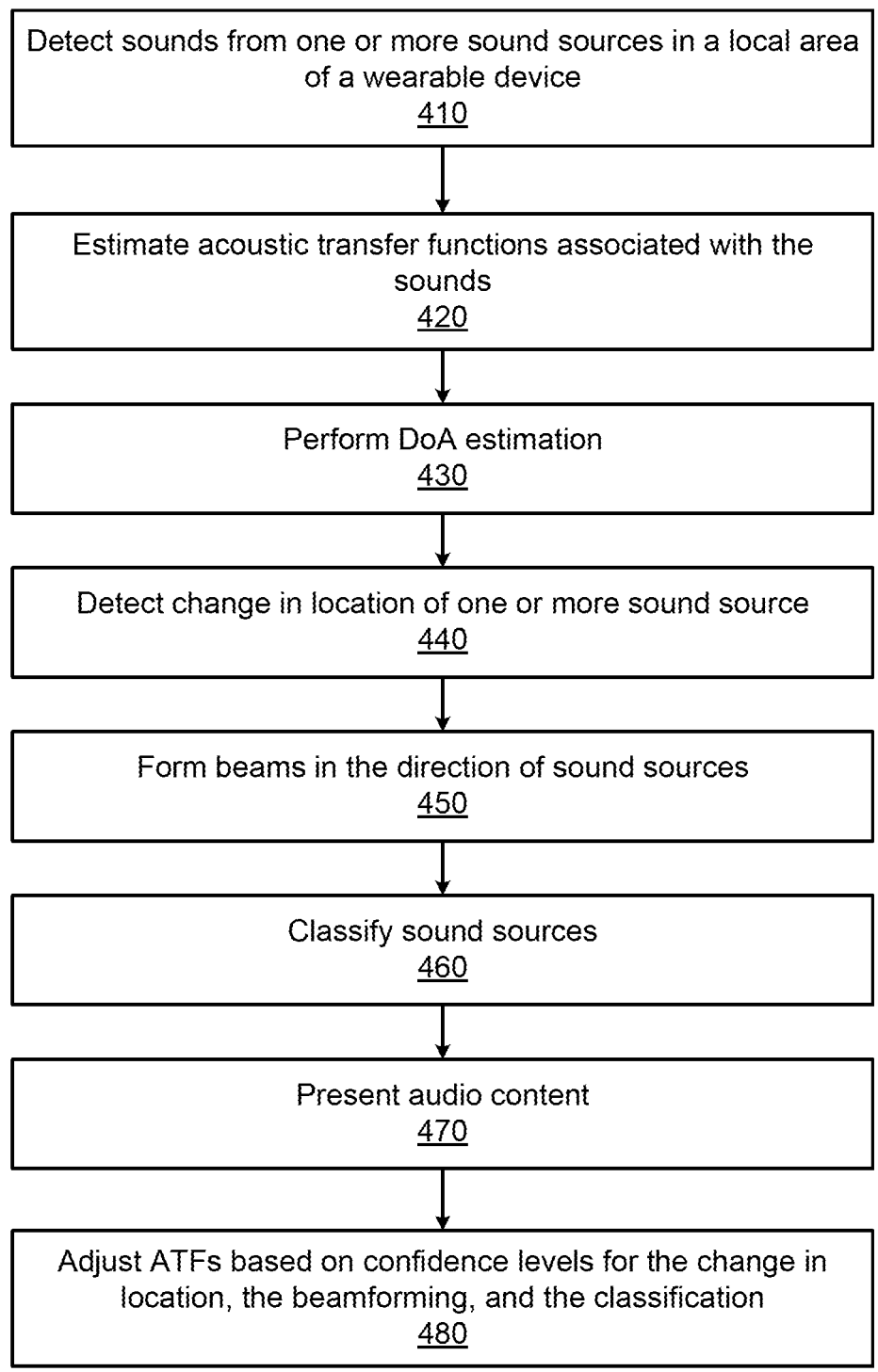
FIG. 4 is a process for analyzing a sound scene, in accordance with one or more embodiments.

FIG. 4 is a flowchart illustrating a process 400 of generating and updating acoustic transfer functions for a wearable device (e.g., wearable device 100) including an audio system (e.g., audio system 300), in accordance with one or more embodiments. In one embodiment, the process of FIG. 4 is performed by components of the audio system. Other entities may perform some or all of the steps of the process in other embodiments (e.g., a console or a remote server). Likewise, embodiments may include different and/or additional steps, or perform the steps in different orders.

The audio system detects 410 sounds from one or more sound sources in a local area surrounding the wearable device. In some embodiments, the audio system stores the information associated with each detected sound in an audio data set.

In some embodiments, the audio system estimates a position of the wearable device in the local area. The estimated position may include a location of the wearable device and/or an orientation of the wearable device or a user's head wearing the wearable device, or some combination thereof. In one embodiment, the wearable device may include one or more sensors that generate one or more measurement signals in response to motion of the wearable device. The audio system may estimate a current position of the wearable device relative to an initial position of the wearable device. In another embodiment, the audio system may receive position information of the wearable device from an external system (e.g., an imaging assembly, an AR or VR console, a SLAM system, a depth camera assembly, a structured light system, etc.).

The audio system estimates 420 one or more acoustic transfer functions associated with the detected sounds. The acoustic transfer function may be an array transfer function (ATF) or a head-related transfer function (HRTF). Accordingly, each acoustic transfer function is associated with a different source location of a detected sound, a different position of a microphone array, or some combination thereof. As a result, the audio system may estimate a plurality of acoustic transfer functions for a particular source location and/or position of the microphone array in the local area.

The audio system performs 430 a Direction of Arrival (DoA) estimation for each detected sound relative to the position of the wearable device. The DoA estimate may be represented as a vector between an estimated source location of the detected sound and the position of the wearable device within the local area. In some embodiments, the audio system may perform a DoA estimation for detected sounds associated with a parameter that meets a parameter condition. For example, a parameter condition may be met if a parameter is above or below a threshold value or falls within a target range. The wearable device may calculate a confidence level for each DoA estimate. For example, the confidence level may range from 1-100, where a theoretical confidence level of 100 represents that there is zero uncertainty in the DoA estimate, and a confidence level of 1 represents a high level of uncertainty in the DoA estimate.

Based on the DoA estimates and the confidence levels for the DoA estimates, the audio system may update the acoustic transfer functions.

The audio system detects 440 a change in location of one or more sound sources. The audio system may store a history of previously estimated DoAs. In some embodiments, the audio system may recalculate DoAs on a periodic schedule, such as once per second, or once per millisecond. The audio system may compare the current DoAs with previous DoAs, and in response to a change in a DoA for a sound source, the audio system may determine that the sound source moved. In some embodiments, the wearable device may detect a change in location based on visual information received by the wearable device or information received from an external data source. The audio system may track the movement of one or more sound sources over time. The wearable device may calculate a confidence level for each determination of a change in movement. Based on the tracking of the sound sources and the confidence levels for the changes in location, the audio system may update the acoustic transfer functions.

If the position of the microphone array changes within the local area, the audio system may generate one or more new acoustic transfer functions or update one or more pre-existing acoustic transfer functions accordingly.

The audio system forms beams 450 in the directions of different sound sources. For example, the audio system may utilize a beamforming process to separate the signals from different sound sources for further analysis. The audio system may analyze and process the sound received from each beam independently. The audio system may enhance the signal received from each beam. The audio system may calculate confidence levels for the beamforming process and use the isolated signals from the sound sources and their respective confidence levels to update the acoustic transfer functions.

The audio system may classify 460 the sound sources. The audio system may compare the signals received from the sound sources with signals associated with known classifications. For example, the audio system may classify a sound source as a human based on a similarity to characteristics of a human classification in a classification library. The audio system may calculate confidence levels for the classification and use the classifications of the sound sources and their respective confidence levels to update the acoustic transfer functions.

The audio system may present 470 sound content using the speaker array. Based on the tracking, the beamforming, and the sound classification, the audio system generates and/or updates sound filters, and provides the sound filters to the speaker array. The speaker array uses the sound filters to present audio content. The sound filters may cause the speaker array to amplify some sounds and suppress others. The specific uses for amplification and suppression may cover any desired purpose. For example, the sound filters may cause the speaker array to amplify the sounds from a sound source that is identified as a human sound source, while suppressing sounds from a sound source identified as a nuisance sound source, such as a fan; the sound filters may suppress speech and amplify white noise to reduce distraction while at work, the sound filters may amplify sound of an approaching vehicle to warn the user; the sound filters may amplify the sound of a crying baby to draw attention; etc.

The audio system may adjust 480 the acoustic transfer functions. The audio system may adjust the acoustic transfer functions based on at least one of the DoA estimates, the changes in location of sound sources, the isolation of the sound sources, or the classification of the sound sources. Additionally, the audio system may use the confidence levels for the respective inputs to adjust the acoustic transfer functions. The transfer function module adjusts the acoustic transfer functions by combining the current/known acoustic transfer functions with new/fresh acoustic transfer functions extracted from the most recent piece of audio signal. The acoustic transfer functions are combined with certain weights, which may be selected based on the confidence levels from the various modules. The weights may be directly proportional to the overall confidence received from all other modules. For example, high confidence implies that the current acoustic transfer functions are accurate, hence adaptation can be slow or stopped, which means a high weight (e.g. greater than 0.5) may be assigned to the known acoustic transfer function component, and low weight (e.g. less than 0.5) may be assigned to the new data. In contrast, if the combined confidence is low for the current acoustic transfer functions, rapid adaptation may be required, in which case a high weight may be assigned to the acoustic transfer functions extracted from the recent audio data.

In some embodiments, the audio system may update the acoustic transfer functions at any point throughout the process 400. The updated acoustic functions may be used to perform DoA estimations, track the sound sources, form beams for the sound sources, identify the sound sources, provide sound filters to the speaker array, and present audio content.

The process 400 may be continuously repeated as a user wearing the microphone array (e.g., coupled to an NED) moves through the local area, or the process 400 may be initiated upon detecting sounds via the microphone array. By using the results of the steps of process 400 as feedback which may be inputs for the estimation of the acoustic transfer functions, the acoustic transfer functions and the overall performance of the audio system and wearable device may be continuously improved.

Example of an Artificial Reality System

Figure 5:
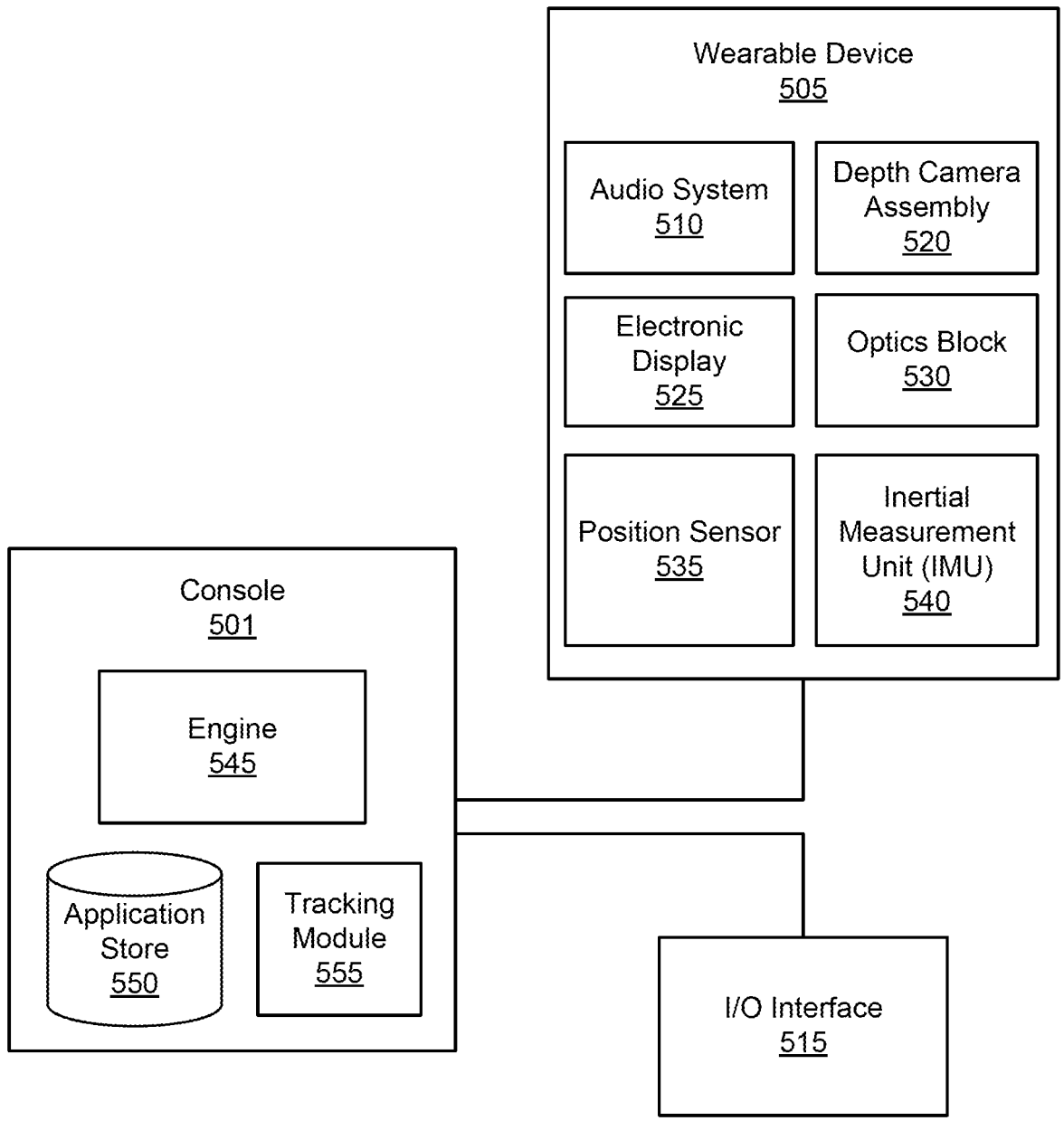
FIG. 5 is a system environment of a wearable device including an audio system, in accordance with one or more embodiments.

FIG. 5 is a system environment of a wearable device 505 including an audio system 510, in accordance with one or more embodiments. The system 500 may operate in an artificial reality environment. The system 500 shown by FIG. 5 comprises a wearable device 505 and an input/output (I/O) interface 515 that is coupled to a console 501. The wearable device 505 may be an embodiment of the wearable device 100. While FIG. 5 shows an example system 500 including one wearable device 505 and one I/O interface 515, in other embodiments, any number of these components may be included in the system 500. For example, there may be multiple wearable devices 505 each having an associated I/O interface 515 with each wearable device 505 and I/O interface 515 communicating with the console 501. In alternative configurations, different and/or additional components may be included in the system 500. Additionally, functionality described in conjunction with one or more of the components shown in FIG. 5 may be distributed among the components in a different manner than described in conjunction with FIG. 5 in some embodiments. For example, some or all of the functionality of the console 501 is provided by the wearable device 505.

The wearable device 505 presents content to a user comprising augmented views of a physical, real-world environment with computer-generated elements (e.g., two dimensional (2D) or three dimensional (3D) images, 2D or 3D video, sound, etc.). The wearable device 505 may be an eyewear device or a head-mounted display. In some embodiments, the presented content includes audio content that is presented via the audio system 300 that receives audio information (e.g., an audio signal) from the wearable device 505, the console 501, or both, and presents audio content based on the audio information.

The wearable device 505 includes the audio system 510, a depth camera assembly (DCA) 520, an electronic display 525, an optics block 530, one or more position sensors 535, and an inertial measurement unit (IMU) 540. The electronic display 525 and the optics block 530 is one embodiment of the lens 110 of FIG. 1. The position sensors 535 and the IMU 540 is one embodiment of sensor device 115 of FIG. 1. Some embodiments of the wearable device 505 have different components than those described in conjunction with FIG. 5. Additionally, the functionality provided by various components described in conjunction with FIG. 5 may be differently distributed among the components of the wearable device 505 in other embodiments, or be captured in separate assemblies remote from the wearable device 505.

The audio system 510 detects sound to generate one or more acoustic transfer functions for a user. The audio system 510 may then use the one or more acoustic transfer functions to generate audio content for the user. The audio system 510 may be an embodiment of the audio system 300. As described with regards to FIG. 3, the audio system 510 may include a microphone array, a controller, and a speaker array, among other components. The microphone array detects sounds within a local area surrounding the microphone array. The microphone array may include a plurality of acoustic sensors that each detect air pressure variations of a sound wave and convert the detected sounds into an electronic format (analog or digital). The controller performs a DoA estimation for the sounds detected by the microphone array. Based in part on the DoA estimates of the detected sounds and parameters associated with the detected sounds, the controller generates one or more acoustic transfer functions associated with the source locations of the detected sounds. The acoustic transfer functions may be ATFs, HRTFs, other types of acoustic transfer functions, or some combination thereof. The controller may generate instructions for the speaker array to emit audio content that seems to come from several different points in space. The audio system 510 may track the locations of the sounds, form beams around the locations of the sounds, and classify the sounds. The results of the tracking, beamforming, and classifying, as well as any associated confidence levels, may be input to the controller to update the acoustic transfer functions.

The DCA 520 captures data describing depth information of a local environment surrounding some or all of the wearable devices 505. The DCA 520 may include a light generator (e.g., structured light and/or a flash for time-of-flight), an imaging device, and a DCA controller that may be coupled to both the light generator and the imaging device. The light generator illuminates a local area with illumination light, e.g., in accordance with emission instructions generated by the DCA controller. The DCA controller is configured to control, based on the emission instructions, operation of certain components of the light generator, e.g., to adjust an intensity and a pattern of the illumination light illuminating the local area. In some embodiments, the illumination light may include a structured light pattern, e.g., dot pattern, line pattern, etc. The imaging device captures one or more images of one or more objects in the local area illuminated with the illumination light. The DCA 520 can compute the depth information using the data captured by the imaging device or the DCA 520 can send this information to another device such as the console 501 that can determine the depth information using the data from the DCA 520.

In some embodiments, the audio system 510 may utilize the depth information which may aid in identifying directions of one or more potential sound sources, depth of one or more sound sources, movement of one or more sound sources, sound activity around one or more sound sources, or any combination thereof.

The electronic display 525 displays 2D or 3D images to the user in accordance with data received from the console 501. In various embodiments, the electronic display 525 comprises a single electronic display or multiple electronic displays (e.g., a display for each eye of a user). Examples of the electronic display 525 include: a liquid crystal display (LCD), an organic light emitting diode (OLED) display, an active-matrix organic light-emitting diode display (AMO-LED), waveguide display, some other display, or some combination thereof.

In some embodiments, the optics block 530 magnifies image light received from the electronic display 525, corrects optical errors associated with the image light, and presents the corrected image light to a user of the wearable device 505. In various embodiments, the optics block 530 includes one or more optical elements. Example optical elements included in the optics block 530 include: a waveguide, an aperture, a Fresnel lens, a convex lens, a concave lens, a filter, a reflecting surface, or any other suitable optical element that affects image light. Moreover, the optics block 530 may include combinations of different optical elements. In some embodiments, one or more of the optical elements in the optics block 530 may have one or more coatings, such as partially reflective or anti-reflective coatings.

Magnification and focusing of the image light by the optics block 530 allows the electronic display 525 to be physically smaller, weigh less, and consume less power than larger displays. Additionally, magnification may increase the field of view of the content presented by the electronic display 525. For example, the field of view of the displayed content is such that the displayed content is presented using almost all (e.g., approximately 110 degrees diagonal), and in some cases, all of the user's field of view. Additionally, in some embodiments, the amount of magnification may be adjusted by adding or removing optical elements.

In some embodiments, the optics block 530 may be designed to correct one or more types of optical error. Examples of optical error include barrel or pincushion distortion, longitudinal chromatic aberrations, or transverse chromatic aberrations. Other types of optical errors may further include spherical aberrations, chromatic aberrations, or errors due to the lens field curvature, astigmatisms, or any other type of optical error. In some embodiments, content provided to the electronic display 525 for display is pre-distorted, and the optics block 530 corrects the distortion when it receives image light from the electronic display 525 generated based on the content.

The IMU 540 is an electronic device that generates data indicating a position of the wearable device 505 based on measurement signals received from one or more of the position sensors 535. A position sensor 535 generates one or more measurement signals in response to motion of the wearable device 505. Examples of position sensors 535 include: one or more accelerometers, one or more gyroscopes, one or more magnetometers, another suitable type of sensor that detects motion, a type of sensor used for error correction of the IMU 540, or some combination thereof. The position sensors 535 may be located external to the IMU 540, internal to the IMU 540, or some combination thereof.

In one or more embodiments, the IMU 540 and/or the position sensor 535 may be monitoring devices capable of monitoring responses of the user to audio content provided by the audio system 300.

Based on the one or more measurement signals from one or more position sensors 535, the IMU 540 generates data indicating an estimated current position of the wearable device 505 relative to an initial position of the wearable device 505. For example, the position sensors 535 include multiple accelerometers to measure translational motion (forward/back, up/down, left/right) and multiple gyroscopes to measure rotational motion (e.g., pitch, yaw, and roll). In some embodiments, the IMU 540 rapidly samples the measurement signals and calculates the estimated current position of the wearable device 505 from the sampled data. For example, the IMU 540 integrates the measurement signals received from the accelerometers over time to estimate a velocity vector and integrates the velocity vector over time to determine an estimated current position of a reference point on the wearable device 505. Alternatively, the IMU 540 provides the sampled measurement signals to the console 501, which interprets the data to reduce error. The reference point is a point that may be used to describe the position of the wearable device 505. The reference point may generally be defined as a point in space or a position related to the eyewear device's 505 orientation and position.

The I/O interface 515 is a device that allows a user to send action requests and receive responses from the console 501. An action request is a request to perform a particular action. For example, an action request may be an instruction to start or end capture of image or video data, or an instruction to perform a particular action within an application. The I/O interface 515 may include one or more input devices. Example input devices include: a keyboard, a mouse, a hand controller, or any other suitable device for receiving action requests and communicating the action requests to the console 501. An action request received by the I/O interface 515 is communicated to the console 501, which performs an action corresponding to the action request. In some embodiments, the I/O interface 515 includes an IMU 540, as further described above, that captures calibration data indicating an estimated position of the I/O interface 515 relative to an initial position of the I/O interface 515. In some embodiments, the I/O interface 515 may provide haptic feedback to the user in accordance with instructions received from the console 501. For example, haptic feedback is provided when an action request is received, or the console 501 communicates instructions to the I/O interface 515 causing the I/O interface 515 to generate haptic feedback when the console 501 performs an action. The I/O interface 515 may monitor one or more input responses from the user for use in determining a perceived origin direction and/or perceived origin location of audio content.

The console 501 provides content to the wearable device 505 for processing in accordance with information received from one or more of: the wearable device 505 and the I/O interface 515. In the example shown in FIG. 5, the console 501 includes an application store 550, a tracking module 555 and an engine 545. Some embodiments of the console 501 have different modules or components than those described in conjunction with FIG. 5. Similarly, the functions further described below may be distributed among components of the console 501 in a different manner than described in conjunction with FIG. 5.

The application store 550 stores one or more applications for execution by the console 501. An application is a group of instructions, that when executed by a processor, generates content for presentation to the user. Content generated by an application may be in response to inputs received from the user via movement of the wearable device 505 or the I/O interface 515. Examples of applications include: gaming applications, conferencing applications, video playback applications, or other suitable applications.

The tracking module 555 calibrates the system environment 500 using one or more calibration parameters and may adjust one or more calibration parameters to reduce error in determination of the position of the wearable device 505 or of the I/O interface 515. Calibration performed by the tracking module 555 also accounts for information received from the IMU 540 in the wearable device 505 and/or an IMU 540 included in the I/O interface 515. Additionally, if tracking of the wearable device 505 is lost, the tracking module 555 may re-calibrate some or all of the system environment 500.

The tracking module 555 tracks movements of the wearable device 505 or of the I/O interface 515 using information from the one or more position sensors 535, the IMU 540, the DCA 520, or some combination thereof. For example, the tracking module 555 determines a position of a reference point of the wearable device 505 in a mapping of a local area based on information from the wearable device 505. The tracking module 555 may also determine positions of the reference point of the wearable device 505 or a reference point of the I/O interface 515 using data indicating a position of the wearable device 505 from the IMU 540 or using data indicating a position of the I/O interface 515 from an IMU 540 included in the I/O interface 515, respectively. Additionally, in some embodiments, the tracking module 555 may use portions of data indicating a position or the wearable device 505 from the IMU 540 to predict a future position of the wearable device 505. The tracking module 555 provides the estimated or predicted future position of the wearable device 505 or the I/O interface 515 to the engine 545. In some embodiments, the tracking module 555 may provide tracking information to the audio system 300 for use in generating the sound filters.

The engine 545 also executes applications within the system environment 500 and receives position information, acceleration information, velocity information, predicted future positions, or some combination thereof, of the wearable device 505 from the tracking module 555. Based on the received information, the engine 545 determines content to provide to the wearable device 505 for presentation to the user. For example, if the received information indicates that the user has looked to the left, the engine 545 generates content for the wearable device 505 that mirrors the user's movement in a virtual environment or in an environment augmenting the local area with additional content. Additionally, the engine 545 performs an action within an application executing on the console 501 in response to an action request received from the I/O interface 515 and provides feedback to the user that the action was performed. The provided feedback may be visual or audible feedback via the wearable device 505 or haptic feedback via the I/O interface 515.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A method comprising:
   detecting, via a microphone array of a wearable device, sounds from one or more sound sources in a local area of the wearable device;
   estimating acoustic transfer functions associated with the sounds;
   estimating a direction of arrival (DoA) of a sound source in the one or more sound sources;
   calculating a first confidence level for the direction of arrival estimate;
   tracking a movement of the sound source;
   calculating a second confidence level for the movement of the sound source; and updating, in response to the movement of the sound source, the acoustic transfer functions based in part on the first confidence level and the second confidence level.

2. The method of claim 1, further comprising classifying the sound source based on a classification library.

3. The method of claim 1, further comprising isolating a signal from the sound source from other sound sources in the local area of the wearable device.

4. The method of claim 2, further comprising calculating a third confidence level for the classifying, and a fourth confidence level for a beamforming process.

5. The method of claim 4, further comprising updating the acoustic transfer functions based on at least one of the third confidence level or the fourth confidence level.

6. The method of claim 1, wherein the tracking comprises:
   storing values for the number and locations of the one or more sound sources over time; and
   detecting a change in at least one of the number or the locations.

7. The method of claim 1, further comprising:
   updating sound filters based in part on the updated acoustic transfer functions; and
   presenting audio content based on the updated sound filters.

8. An audio system comprising:
   a microphone array configured to detect sounds from one or more sound sources in a local area of the audio system; and
   a controller configured to:
   detect, via a microphone array of a wearable device, sounds from one or more sound sources in a local area of the wearable device;
   estimate acoustic transfer functions associated with the sounds;
   estimate a direction of arrival (DoA) of a sound source in the one or more sound sources;
   calculate a first confidence level for the direction of arrival estimate;
   track a movement of the sound source;
   calculate a second confidence level for the movement of the sound source; and
   update, in response to the movement of the sound source, the acoustic transfer functions based in part on the first confidence level and the second confidence level.

9. The audio system of claim 8, wherein the controller is further configured to classify the sound source based on a classification library.

10. The audio system of claim 8, wherein the controller is further configured to isolate a signal from the sound source from other sound sources in the local area of the wearable device.

11. The audio system of claim 9, wherein the controller is further configured to calculate third confidence level for the classifying, and a fourth confidence level for a beamforming process.

12. The audio system of claim 11, wherein the controller is further configured to update the acoustic transfer functions based on at least one of the third confidence level or the fourth confidence level.

13. The audio system of claim 8, wherein the tracking of the movement comprises:
   storing values for the number and locations of the one or more sound sources over time; and
   detecting a change in at least one of the number or the locations.

14. The audio system of claim 8, wherein the controller is further configured to:
   update sound filters based in part on the updated acoustic transfer functions; and
   present audio content based on the updated sound filters.

15. The audio system of claim 8, wherein the controller is further configured to generate a notification of the movement of the sound source.

16. A non-transitory computer-readable storage medium comprising instructions executable by a processor, the instructions when executed causing the processor to perform actions comprising:
   detecting, via a microphone array of a wearable device, sounds from one or more sound sources in a local area of the wearable device;
   estimating acoustic transfer functions associated with the sounds;
   estimating a direction of arrival (DoA) of a sound source in the one or more sound sources;
   calculating a first confidence level for the direction of arrival estimate;
   tracking a movement of the sound source;
   calculating a second confidence level for the movement of the sound source; and
   updating, in response to the movement of the sound source, the acoustic transfer functions based in part on the first confidence level and the second confidence level.

17. The non-transitory computer-readable storage medium of claim 16, the actions further comprising classifying the sound source based on a classification library.

18. The non-transitory computer-readable storage medium of claim 17, the actions further comprising calculating a third confidence level for the classifying, and a fourth confidence level for a beamforming process.

19. The non-transitory computer-readable storage medium of claim 17, the actions further comprising:
   updating sound filters based in part on the updated acoustic transfer functions; and
   presenting audio content based on the updated sound filters.

20. The non-transitory computer-readable storage medium of claim 16, the actions further comprising isolating a signal from the sound source from other sound sources in the local area of the wearable device.

* * * * *